United States Patent [19]

Imhof et al.

[11] 4,332,221
[45] Jun. 1, 1982

[54] COOLING SYSTEM FOR, AND METHOD OF COOLING AN INTERNAL COMBUSTION ENGINE

[75] Inventors: Ernst Imhof, Münchingen; Günther Schmid, Stuttgart, both of Fed. Rep. of Germany

[73] Assignee: Robert Bosch GmbH, Stuttgart, Fed. Rep. of Germany

[21] Appl. No.: 113,256

[22] Filed: Jan. 18, 1980

[30] Foreign Application Priority Data

Feb. 24, 1979 [DE] Fed. Rep. of Germany ....... 2907353

[51] Int. Cl.³ ................................................ F01P 7/00
[52] U.S. Cl. .............................. 123/41.08; 123/41.42; 123/41.10
[58] Field of Search ................ 123/41.02, 41.08, 41.09, 123/41.10, 41.19, 41.42

[56] References Cited

U.S. PATENT DOCUMENTS

| | | | |
|---|---|---|---|
| 1,634,394 | 7/1927 | Bernard | 123/41.42 |
| 2,507,643 | 5/1950 | Oaks | 123/41.42 |
| 2,519,692 | 8/1950 | Oaks | 123/41.42 |
| 2,537,694 | 1/1951 | Oaks | 123/41.42 |
| 3,162,183 | 12/1964 | Gratzmuller | 123/41.08 |
| 3,765,384 | 10/1973 | Barnard | 123/41.42 |

*Primary Examiner*—Craig R. Feinberg
*Assistant Examiner*—W. R. Wolfe
*Attorney, Agent, or Firm*—Frishauf, Holtz, Goodman & Woodward

[57] ABSTRACT

A cooling system and a method of operation of a cooling system for an internal combustion engine in which the coolant is a heat-retaining storage medium capable of being super-cooled. A suitable medium is found to be, especially, sodium acetate trihydrate mixed with water. The coolant according to the invention may be caused to solidify and crystallize just prior to an intended engine starting, thereby releasing the latent heat of fusion and preheating the engine. The preheating of the engine results in reduced run-up times, a reduced degree of fuel enrichment during cold starting, a decrease in toxic exhaust components during cold starting and decreased water and tear. The invention provides for valves in the cooling system which isolate the engine from the remainder of the cooling system until the coolant has been reliquified completely.

8 Claims, 1 Drawing Figure

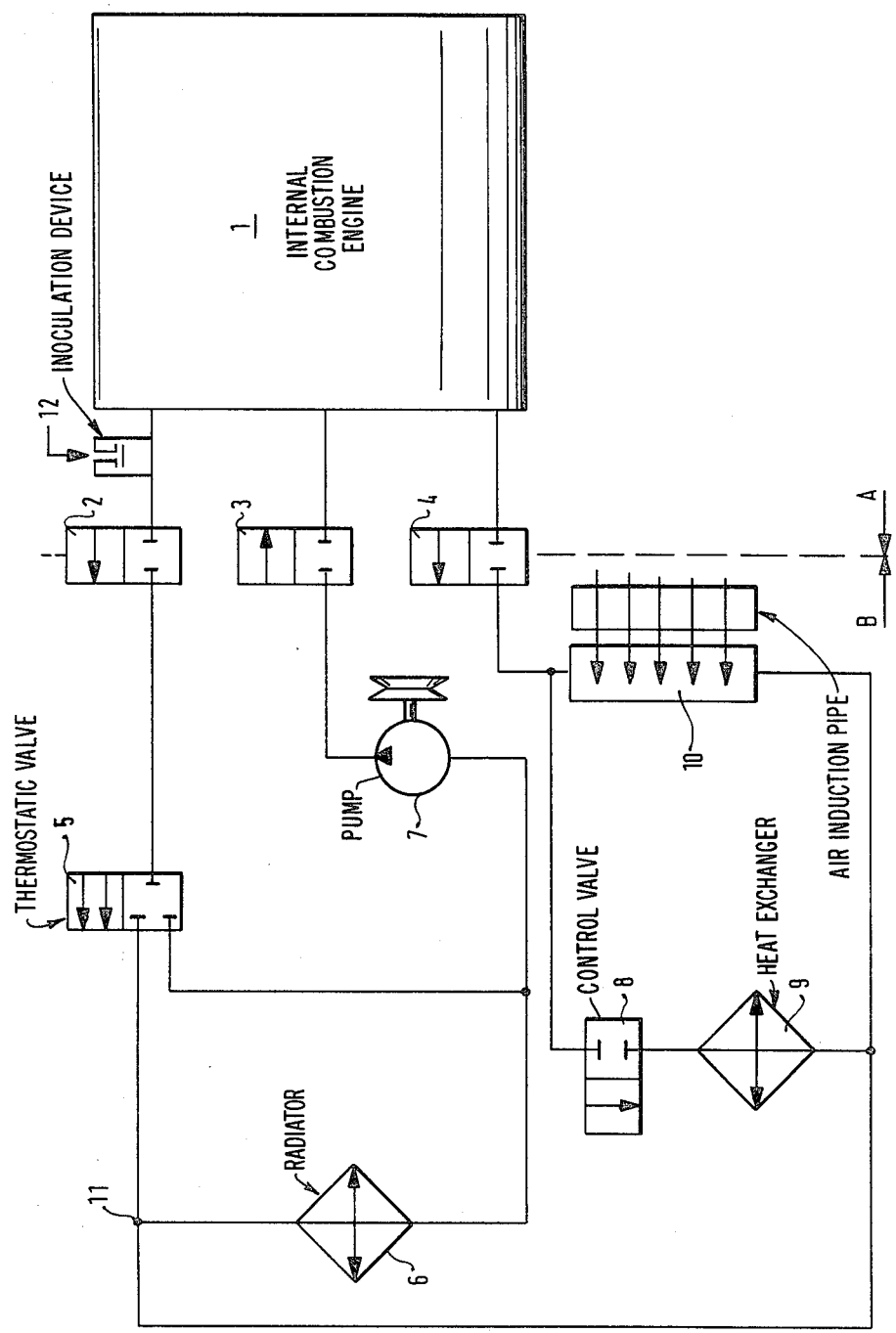

COOLING SYSTEM FOR, AND METHOD OF COOLING AN INTERNAL COMBUSTION ENGINE

FIELD OF THE INVENTION

The invention relates to cooling an internal combustion engine employing a circulating coolant. More particularly, the invention relates to a cooling system and method in which a liquid coolant circulates through the engine and the radiator for the general purpose of removing excess heat from the engine and delivering it to the ambient atmosphere.

BACKGROUND OF THE INVENTION AND PRIOR ART

The heat generated by an internal combustion engine is generally so great that a special cooling system must be provided to remove heat from the engine in a positive manner and transport it to a reservoir capable of absorbing the excess heat, usually the atmosphere. A commonly employed cooling system uses internal engine conduits through which a liquid coolant circulates under the control of a suitable pump and suitable control valve. The liquid coolant is passed through a radiator generally subjected to selective air flow in which the heat exchange with the atmosphere occurs. Customarily, the coolant is water to which an anti-freeze compound is added in the winter season. Common anti-freeze substances are water-soluble fluids, usually glycol compounds, for example ethylene glycol which may have a number of additives to prevent corrosion, foam formation and to close off minor leaks in the system. The temperature at which the mixture solidifies depends on the ratio of anti-freeze compound to the amount of water present. When an engine is started from the cold state, it is generally desired to attain the operating temperature as rapidly as possible, because only at the correct engine temperature is it feasible to conform to the various optimum conditions of operation, for example the minimum exhaust gas toxicity, minimum fuel consumption, minimum wear and tear, etc. Accordingly, it is desired to make the starting and warm-up phase of the engine operation as short as possible. To accomplish this objective, the water coolant flow is controlled in such a way as to prevent coolant circulation until such time as the engine is sufficiently heated. The coolant flow is usually regulated by thermostatic control valves.

In order to shorten the time required for engine warm-up, it has previously been proposed to preheat parts or all of the engine. However, such preheating requires the expenditure of large amounts of energy and substantial preheating times and is thus highly uneconomical.

THE INVENTION

It is an object of the present invention to provide a cooling system which substantially reduces the warm-up period when compared with conventional systems. An associated object of the invention is to thereby prevent excessive wear and tear during the warm-up operation.

According to the invention a cooling system is provided in which the coolant medium can be super-cooled below its normal solidification temperature and can thus be used as a latent heat retainer. The coolant medium according to the invention may be used as a heat storage medium as well as a heat transfer and cooling medium. When heat is stored, the coolant is super-cooled and the latent heat of fusion is released prior to starting the engine so as to provide a given amount of heat to the engine and the engine parts causing them to be preheated so that the starting and warm-up phase of the engine is shortened. Furthermore, the degree of fuel enrichment during the warm-up phase can be reduced, resulting in a fuel saving and a reduction of toxic emissions in the exhaust gas as well as reduction of wear and tear.

The latent heat stored in the coolant medium is previously supplied by excess engine heat. Accordingly, the same medium serves for cooling the engine as well as for heat retention. The exchange of heat takes place only between hot parts of the engine and the coolant medium but does not make express use of any heat contained in the exhaust gases of the engine. Such use would require the employment of a second heat-carrying medium as well as additional apparatus for control, safety and the like and these are not required when a single coolant is used as proposed by the present invention.

The various advantages attained by the present invention are these:

Engine heat is stored for subsequent use during cold starting without any additional heat insulation, i.e., heat may be stored indefinitely without any loss due to conduction or convection.

The length of time during which the latent heat may stored without loss is virtually indefinite if the outside temperatures are sufficiently low.

The use of the coolant according to the invention makes it possible to dispense with a normal anti-freeze compound. If the temperatures are expected to fall below $-15°$ C., the water content in the coolant may have to be increased, for example from 15 to 20% by weight.

Due to the preheating by latent heat contained in the coolant according to the invention, the starting effort at low temperatures is substantially reduced and makes it possible to use the battery power much more efficiently.

The reduced gasoline consumption, which is especially significant for vehicles that are used for many short trips requiring a large number of cold starts, substantially increases the economy of operation of the vehicle.

The reduced fuel enrichment results in a substantial reduction of hydrocarbon and CO emissions in the exhaust gas during cold starting.

The increased starting temperature and the reduced warm-up time result in reduction of the wear and tear in the warm-up phase of engine operation.

The invention is embodied in a manner providing for separation of the coolant circuit into at least two loops by means of solenoid valves preferably located in the immediate vicinity of the engine. This location insures that the heat given up by the coolant is transmitted substantially only to the engine and that the solidification of the coolant in the warm-up phase does not take place in associated accessories, for example the radiator or the heater circuit of the engine. The heating and melting of the solidified, crystallized heat storage medium, i.e., the charging process, is intended to take place exclusively within the engine itself.

Advantageously, the invention provides for an inoculating mechanism located in the vicinity of the engine housing for injecting a minute amount of seed crystal into the coolant at the time the latent heat of solidification is needed for preheating the engine prior to a cold start.

A particularly advantageous compound for use as the super-coolable engine coolant is sodium acetate trihydrate mixed with 10-25% by weight of water. A mixture of this substance with water results in a rapid crystallization rate and hence a rapid return of the latent heat of fusion by the heat-retaining coolant. A conspicuous advantage of the mixture of the super-coolable substance with water is that, after crystallization, the mixture remains stirrable, i.e., it does not freeze in a solid block.

Still further features and advantages of the invention will become apparent from the description of a preferred exemplary embodiment of the invention which relates to the drawing.

THE DRAWING

The single FIGURE of the drawing is a schematic diagram of a cooling system of an internal combustion engine according to the invention.

DESCRIPTION OF THE PREFERRED EMBODIMENT

In the drawing, an internal combustion engine 1 is equipped with a main coolant circuit which includes a cooling medium space within the engine, a conduit that passes through a preliminary solenoid valve 2, through a thermostatically controlled coolant regulator 5, through the engine radiator 6, through the coolant pump 7 and back to the engine 1 through another solenoid valve 3. The thermostatic valve 5 also permits an immediate return of coolant to the engine without passing through the radiator 6 if the engine temperature is below a given value.

The engine is equipped with an auxiliary coolant circuit, for example for heating the passenger space of the vehicle or other accessories. The auxiliary coolant circuit includes a solenoid valve 4, a mechanical heat regulating valve 8 and a heat exchanger 9. Furthermore, heat may be supplied, for example, to the air induction pipe 10 of the engine. The hot coolant may be suitably derived from a junction 11 at the main cooling circuit. The flow of coolant through the auxiliary cooling or heating loop is maintained by the main cooling pump 7.

The function of the cooling system of the engine including engine heat retention and storage is as follows: When the coolant employed is a mixture of sodium acetate trihydrate with, for example, 15% by weight of water instead of a customary water-glycol mixture, the coolant becomes a heat-retaining storage medium. The addition of water changes the characteristics of the chemical in the following way.

The melting point is reduced from +58° C. for pure trihydrate to +49° C. resulting in a rapid thermal recharging of the heat-retaining medium.

The addition of water makes it possible to super-cool the coolant to lower temperatures than is possible with pure trihydrate. In pure trihydrate, the spontaneous crystallization and thus the release of the latent heat of fusion can start between +2.5° and −12.5° C. If water is added in an amount equal to, for example, 15% by weight, spontaneous crystallization does not occur until the temperature falls to between −14° C. and −18° C.

Furthermore, the addition of water causes the mixture to crystallize in a stirrable mass, i.e., a slush-like condition rather than a single rigid block. Thus the mobility of the crystals is maintained and the engine is not subjected to possibly dangerous expansive or other stresses which might occur during total solidification.

As is illustrated in the drawing, the overall cooling system of the engine is divided into two regions. The melting region A, substantially defined by the coolant space of the engine itself, may be sealed hermetically with respect to the remainder of the coolant system as well as with respect to the surrounding atmosphere by three solenoid valves 2, 3, 4, disposed in the vicinity of the engine. The engine may suitably be provided with internal expansion chambers which guard it against damage from excessive pressure. The process of storing and releasing latent heat of fusion, i.e., the melting and crystallizing processes of the coolant, is intended to take place only in the region A. The valves 2, 3, 4 are located near the engine in preferably such a way as to be heatable by engine heat to a temperature lying above the melting point of the coolant. In this way, the existence of remaining solid crystals in the valve is eliminated and such crystals cannot initiate an unintentional triggering of the solidification process of the coolant. The remaining coolant region B includes all other apparatus and accessories attached to the cooling system. The super-cooled medium in the region B is not crystallized at any time. The communication between the regions A and B is established only after the coolant in region A, i.e., in the engine, has been completely melted and has reattained its liquid state, i.e., only after the thermal recharging is complete. This communication may be established, for example, when the engine has reached normal operating temperature.

The property of super-cooling the coolant medium is utilized in both regions A and B, however. As a consequence, even when the temperature of the mixture has dropped far below its melting point, the state of aggregation of the coolant is unchanged and it remains liquid. This metastable physical state can be maintained indefinitely provided certain conditions are met, for example if the coolant is hermetically sealed with respect to its surroundings. Suitably, the melting region B, which includes the radiator and the accessories, is sealed in such a way as to be inaccessible by untrained service personnel so as to prevent an unintentional triggering, i.e., crystallization, of the heat storage medium in the region B while it is in the super-cooled phase.

The release of the heat of fusion stored in the heat storage medium, i.e., within the sodium acetate trihydrate-water mixture, is triggered by an isomorphic inoculation. This inoculation is performed by the injection into the coolant of a crystallite of the same chemical substance, namely sodium acetate trihydrate, whose mass need not be greater than $10^{-21}$ grams. This seed crystal transmits to the metastable solution the crystal lattice information required for crystallization.

The inoculation takes place when the engine is to be preheated during a cold start. At that time, the solenoid valves 2, 3, 4 are closed and the inoculation device 12 imparts a seed crystal to the super-cooled mixture at a temperature less than 49° C. During crystallization, the coolant releases an amount of heat equal to approximately 52 Wh/Kg to the engine which is thereby heated. During the process, the coolant is also heated up to a melting temperature of 49° C.

The crystallized mixture which represents the solid phase of the mixture is actually a stirrable mass which is then continuously liquified completely as the engine warms up. Only after the heat storage medium is completely liquified are the solenoid valves opened to thereby establish the normal coolant circulation. The solenoid valves 2, 3, 4 may be controlled, for example, on the basis of data from a thermal sensor disposed at some suitable point in the engine, for example at a temperature of approximately 70° C. or at the normal operating temperature of the engine so as to prevent any remanent crystals from entering the region B and cause an unintentional crystallization there.

When the engine is turned off, the temperature of the coolant may drop below the melting point (+49° C.) down to the ambient temperature of the surrounds of the motor. However, the coolant remains fluid and is super-cooled so that the heat of fusion is retained by the medium until crystallization occurs at a later point due to inoculation as described above.

The period of time during which the heat is retained in this manner is substantially indefinite.

The cooling system according to the invention may be used in all internal combustion engines. In particular, the cooling system would seem to be suited for association with the engines of motor vehicles. However, it may also be advantageously employed in stationary engines, for example emergency generators, and the like.

The foregoing description relates to a merely preferred exemplary embodiment of the invention, it being understood that changes and variations may be made thereto by persons skilled in the art without departing from the scope of the invention.

We claim:

1. A method for cooling an internal combustion engine, in which the engine is formed with an engine cooling space, and the engine further has a coolant circuit including
    a radiator (6), a coolant pump (7), valves (2, 3, 4), and cooling medium conduit means connecting the valves, the radiator, and the coolant pump,
    and a super-coolable cooling medium capable of retaining heat of fusion is located within said cooling circuit;
    said method comprising
    arranging at least two of said valves (2, 3) for hermetically isolating the engine cooling space from said coolant circuit;
    providing an inoculating device (12) for imparting to said super-coolant a seed crystal;
    closing two of said valves prior to a cold start of the engine and isolating the engine cooling space from said coolant circuit;
    injecting a seed crystal by means of said inoculating device;
    and opening said two of said valves after the temperature of the coolant in said space has risen to a temperature above the melting point thereof.

2. Cooling system for an internal combustion engine comprising
    a cooling circuit including
    an engine cooling space;
    a radiator (6);
    a coolant pump (7);
    controlled valves (2, 3, 4);
    and cooling medium conduit means connecting the valves, the radiator, and the inlet pump;
    and a super-coolable cooling medium capable of retaining heat of fusion within said coolant circuit,
    wherein said valves are electrically operated valves disposed in the vicinity of the engine, at least two of said valves (2, 3) being connected in said coolant circuit and to said engine cooling space for isolating the coolant space in the engine hermetically from the coolant conduit means of the coolant circuit.

3. A cooling system according to claim 2, further comprising an inoculating device for placing a seed crystal in the cooling medium contained within the cooling space.

4. A cooling system according to claim 2, wherein said coolant is sodium acetate trihydrate mixed with 10–25% by weight of water.

5. A cooling system according to claim 2, wherein said valves are so disposed as to be capable of being heated by engine heat to a temperature lying above the melting point of the heat-retaining coolant.

6. A cooling system according to claim 2, including provision for hermetically sealing said system with respect to its surrounds and making it inaccessible to untrained personnel.

7. A cooling system according to claim 2, wherein one of said valves is an electrically controlled inlet valve (2) connected to the cooling space and the other of said valves is an electrically controlled return valve (3) connected to the cooling space, and a third of said valves (5) is a coolant flow regulating valve serially connected to said circuit for controlling the rate of coolant flow through the main coolant channel of said system.

8. A cooling system according to claim 7, comprising a third electrically operated valve 4 for controlling coolant flow through accessories (9, 10) of the engine in a secondary coolant loop of said circuit.

* * * * *